United States Patent
Zhong (10) Patent No.: US 9,503,896 B2
(45) Date of Patent: Nov. 22, 2016

(54) PROCESSING METHOD OF WIRELESS NETWORK DEVICE, WIRELESS NETWORK DEVICE, AND PROCESSOR OF WIRELESS NETWORK DEVICE

(71) Applicant: Huawei Device Co., Ltd., Shenzhen (CN)

(72) Inventor: Zhen Zhong, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/526,772

(22) Filed: Oct. 29, 2014

(65) Prior Publication Data

US 2015/0082397 A1    Mar. 19, 2015

Related U.S. Application Data

(63) Continuation of application No. PCT/CN2013/083506, filed on Sep. 13, 2013.

(51) Int. Cl.
G06F 7/04 (2006.01)
H04W 12/06 (2009.01)
(Continued)

(52) U.S. Cl.
CPC .............. *H04W 12/06* (2013.01); *H04W 4/02* (2013.01); *H04W 4/023* (2013.01); *H04L 63/083* (2013.01); *H04W 84/12* (2013.01)

(58) Field of Classification Search
CPC .............................. H04W 12/06; G06F 21/43
USPC .......................................................... 726/5
See application file for complete search history.

(56) References Cited

U.S. PATENT DOCUMENTS 8,302,152 B1    10/2012 Hewinson
2006/0018481 A1    1/2006 Nagano et al.
(Continued)

FOREIGN PATENT DOCUMENTS

CN    1842000 A    10/2006
CN    102204307 A    9/2011
(Continued)

OTHER PUBLICATIONS

Foreign Communication From a Counterpart Application, European Application No. 13883344.7, Extended European Search Report dated Jul. 15, 2015, 6 pages.
(Continued)

*Primary Examiner* — Teshome Hailu
(74) *Attorney, Agent, or Firm* — Conley Rose, P.C.

(57) ABSTRACT

An authentication processing method, a processor of a wireless network device, and the wireless network device. The method includes receiving, by a wireless network device, a network access request sent by a user equipment; and if the wireless network device determines, according to the network access request, that the user equipment meets a set condition, performing authentication on the user equipment using a password-free authentication manner, or assigning permission, which is corresponding to the set condition, on a Web administrator page to the user equipment. In embodiments of the present invention, if it is determined that a user equipment meets a set condition, authentication is performed on the user equipment using a password-free authentication manner, and corresponding authentication manners are used according to different user requirements, so that an authentication manner of the wireless network device is more flexible, and network access experience of a user is improved.

12 Claims, 5 Drawing Sheets

(51) Int. Cl.
*H04W 4/02* (2009.01)
*H04L 29/06* (2006.01)
*H04W 84/12* (2009.01)

(56) References Cited

U.S. PATENT DOCUMENTS

| | | | | |
|---|---|---|---|---|
| 2006/0288413 | A1* | 12/2006 | Kubota | H04L 63/1458 726/23 |
| 2007/0076875 | A1 | 4/2007 | Kaechi | |
| 2007/0113269 | A1* | 5/2007 | Zhang | H04L 63/08 726/4 |
| 2011/0072501 | A1 | 3/2011 | Fukui | |
| 2011/0163606 | A1* | 7/2011 | Kumar | G05B 15/02 307/84 |
| 2011/0252071 | A1 | 10/2011 | Cidon | |
| 2012/0266062 | A1 | 10/2012 | Zhao et al. | |
| 2012/0323717 | A1 | 12/2012 | Kirsch | |
| 2013/0074142 | A1 | 3/2013 | Brennan et al. | |
| 2013/0219454 | A1 | 8/2013 | Hewinson | |
| 2014/0036703 | A1* | 2/2014 | Ding | H04W 48/04 370/252 |
| 2014/0068098 | A1* | 3/2014 | Anchan | H04W 12/06 709/235 |

FOREIGN PATENT DOCUMENTS

| | | |
|---|---|---|
| CN | 102611597 A | 7/2012 |
| CN | 102791016 A | 11/2012 |
| CN | 102869014 A | 1/2013 |
| CN | 103139705 A | 6/2013 |
| CN | 103181208 A | 6/2013 |
| CN | 103765855 A | 4/2014 |
| JP | 2005039787 A | 2/2005 |
| JP | 2007104443 A | 4/2007 |
| JP | 2009017335 A | 1/2009 |
| JP | 2010109568 A | 5/2010 |
| JP | 2011065590 A | 3/2011 |
| JP | 2011205194 A | 10/2011 |
| JP | 2013515986 A | 5/2013 |
| WO | 2005004385 A1 | 1/2005 |

OTHER PUBLICATIONS

Partial English Translation and Abstract of Chinese Patent Application No. CN1842000A, Nov. 25, 2014, 4 pages.
Partial English Translation and Abstract of Chinese Patent Application No. CN102204307A, Nov. 25, 2014, 6 pages.
Partial English Translation and Abstract of Chinese Patent Application No. CN102869014A, Nov. 25, 2014, 6 pages.
Partial English Translation and Abstract of Chinese Patent Application No. CN103765855A, Nov. 25, 2014, 3 pages.
Foreign Communication From a Counterpart Application, PCT Application No. PCT/CN2013/083506, International Search Report dated Jun. 18, 2014, 7 pages.
Foreign Communication From a Counterpart Application, PCT Application No. PCT/CN2013/083506, Written Opinion dated Jun. 18, 2014, 7 pages.
Partial English Translation and Abstract of Japanese Patent Application No. JPA200539787, Apr. 6, 2016, 106 pages.
Partial English Translation and Abstract of Japanese Patent Application No. JPA2007104443, Apr. 6, 2016, 59 pages.
Partial English Translation and Abstract of Japanese Patent Application No. JPA200917335, Apr. 6, 2016, 51 pages.
Partial English Translation and Abstract of Japanese Patent Application No. JPA2010109568, Apr. 6, 2016, 90 pages.
Partial English Translation and Abstract of Japanese Patent Application No. JPA201165590, Apr. 6, 2016, 47 pages.
Partial English Translation and Abstract of Japanese Patent Application No. JPA2011205194, Apr. 6, 2016, 44 pages.
Partial English Translation and Abstract of Japanese Patent Application No. JPA2013515986, Apr. 6, 2016, 33 pages.
Foreign Communication From a Counterpart Application, Japanese Application No. 2015-535967, Japanese Office Action dated Feb. 2, 2016, 7 pages.
Foreign Communication From a Counterpart Application, Japanese Application No. 2015-535967, English Translation of Japanese Office Action dated Feb. 2, 2016, 8 pages.
Partial English Translation and Abstract of Chinese Patent Application No. CN102611597, Apr. 21, 2016, 8 pages.
Partial English Translation and Abstract of Chinese Patent Application No. CN102791016, Apr. 21, 2016, 15 pages.
Foreign Communication From a Counterpart Application, Chinese Application No. 201380001365.X, Chinese Office Action dated Mar. 7, 2016, 4 pages.
Foreign Communication From a Counterpart Application, Chinese Application no. 201380001365.X, Chinese Search Report dated Feb. 26, 2016, 2 pages.
Foreign Communication From a Counterpart Application, European Application No. 13883344.7, European Office Action dated Jun. 27, 2016, 5 pages.

* cited by examiner

PROCESSING METHOD OF WIRELESS NETWORK DEVICE, WIRELESS NETWORK DEVICE, AND PROCESSOR OF WIRELESS NETWORK DEVICE

CROSS-REFERENCE TO RELATED APPLICATIONS

This application is a continuation of International Application No. PCT/CN2013/083506, filed on Sep. 13, 2013, which is hereby incorporated by reference in its entirety.

TECHNICAL FIELD

The present invention relates to the field of communications technologies, and in particular, to a processing method of a wireless network device, the wireless network device, and a processor of the wireless network device.

BACKGROUND

Currently, as network communications technologies develop by leaps and bounds, the number of network users increases dramatically. In existing wired network access, a password manner is generally used to perform identity authentication prior to network access, whereas in wireless network access, a wired equivalent privacy (WEP) or a Wi-Fi protected access (WPA) pre-shared key (PSK) manner is generally used, and all users use a same password.

In a use process, a manner such as the WEP or the WPA PSK is used to access a network, all users use a same authentication manner and have same access permission, and consequently user experience is not friendly.

SUMMARY

In view of this, embodiments of the present invention provide a processing method of a wireless network device, the wireless network device, and a processor of the wireless network device, which avoid using a uniform authentication or permission management manner for a user equipment and bringing inconvenience to a user.

According to a first aspect, a processing method of a wireless network device is provided, the method comprising receiving, by the wireless network device, a network access request sent by a user equipment; if the wireless network device determines, according to the network access request, that the user equipment meets a set condition, performing authentication on the user equipment using a password-free authentication manner, or assigning permission, which is corresponding to the set condition, on a Web administrator page to the user equipment; and if the wireless network device determines, according to the network access request, that the user equipment does not meet the set condition, performing authentication on the user equipment using a password-specific authentication manner.

In a first possible implementation manner of the first aspect, receiving, by the wireless network device, a request for accessing the Web administrator page that is sent by the user equipment; and if the wireless network device determines, according to the request for accessing the Web administrator page, that the user equipment meets the set condition, authenticating, using the password-free authentication manner, management of accessing, by the user equipment, the Web administrator page, or assigning the permission, which is corresponding to the set condition, on the Web administrator page to the user equipment.

With reference to the first aspect and any one of the foregoing possible implementation manners of the first aspect, in a second possible implementation manner, first M accessing user equipments after the wireless network device is turned on for the first time, or first N accessing user equipments after the wireless network device is powered on every time, where M=1, 2, 3 . . . , and N=1, 2, 3 . . . .

With reference to the first aspect and any one of the foregoing possible implementation manners of the first aspect, in a third possible implementation manner, the set condition further includes a user equipment whose media access control (MAC) address is a specified MAC address, a user equipment whose internet protocol (IP) address is a specified IP address, a user equipment whose equipment name is a specified equipment name, or a user equipment whose equipment type is a specified equipment type.

With reference to the first aspect and any one of the foregoing possible implementation manners of the first aspect, in a fourth possible implementation manner, a user equipment that performs accessing at a set time after the wireless network device is powered on every time, a user equipment that performs accessing at a specified distance, or a user equipment that performs accessing at a specified time.

With reference to the first aspect and any one of the foregoing possible implementation manners of the first aspect, in a fifth possible implementation manner, the if it is determined that the user equipment meets a set condition, performing authentication on the user equipment using a password-free authentication manner includes, if it is determined that the user equipment meets the set condition, performing access authentication on the user equipment using the password-free authentication manner, so that the user equipment establishes a connection to a network.

With reference to the first aspect and any one of the foregoing possible implementation manners of the first aspect, in a sixth possible implementation manner, the if it is determined that the user equipment meets a set condition, performing authentication on the user equipment using a password-free authentication manner includes, if it is determined that the user equipment meets the set condition, performing management authentication, using the password-free authentication manner, on the user equipment for accessing the web administrator page, so that the user equipment accesses the web administrator page without a password.

With reference to the first aspect and any one of the foregoing possible implementation manners of the first aspect, in a seventh possible implementation manner, if it is determined that the user equipment meets the set condition, read-only permission or read/write permission, which is corresponding to the set condition, on the Web administrator page is assigned to the user equipment.

According to a second aspect, a controller of a wireless network device is provided, including a reception control module, a determining module, an authentication module, and a permission assigning module, where the reception control module controls a receiver to receive a network access request sent by a user equipment; the determining module determines that the user equipment meets a set condition; the authentication module performs authentication on the user equipment using a password-free authentication manner, or the permission assigning module assigns permission, which is corresponding to the set condition, on a Web administrator page to the user equipment; the determining module determines that the user equipment does not meet the set condition; and the authentication module performs authentication on the user equipment using a password-specific authentication manner.

In a first possible implementation manner of a second aspect, the processor includes a second reception control module; the second reception control module controls the receiver to receive a request for accessing the Web administrator page that is sent by the user equipment; the determining module determines, according to the request for accessing the Web administrator page, that the user equipment meets the set condition; and the authentication module performs authentication on the user equipment using the password-free authentication manner, or the permission assigning module assigns the permission, which is corresponding to the set condition, on the Web administrator page to the user equipment.

With reference to the second aspect and any one of the foregoing possible implementation manners of the second aspect, in a second possible implementation manner, the set condition includes first M accessing user equipments after the wireless network device is turned on for the first time, or first N accessing user equipments after the wireless network device is powered on every time, where M=1, 2, 3 . . . , and N=1, 2, 3 . . . .

With reference to the second aspect and any one of the foregoing possible implementation manners of the second aspect, in a third possible implementation manner, the set condition further includes a user equipment whose MAC address is a specified MAC address, a user equipment whose IP address is a specified IP address, a user equipment whose equipment name is a specified equipment name, or a user equipment whose equipment type is a specified equipment type.

With reference to the second aspect and any one of the foregoing possible implementation manners of the second aspect, in a fourth possible implementation manner, the set condition further includes a user equipment that performs accessing at a set time after the wireless network device is powered on every time, a user equipment that performs accessing at a specified distance, or a user equipment that performs accessing at a specified time.

With reference to the second aspect and any one of the foregoing possible implementation manners of the second aspect, in a fifth possible implementation manner, the authentication module includes an access authentication module, and the access authentication module performs access authentication on the user equipment using the password-free authentication manner.

With reference to the second aspect and any one of the foregoing possible implementation manners of the second aspect, in a sixth possible implementation manner, the authentication module includes a management authentication module, and the management authentication module performs management authentication, using the password-free authentication manner, on the user equipment for accessing the web administrator page.

With reference to the second aspect and any one of the foregoing possible implementation manners of the second aspect, in a seventh possible implementation manner, the permission assigning module assigns read-only permission or read/write permission, which is corresponding to the set condition, on the Web administrator page to the user equipment.

According to a third aspect, a wireless network device is provided, including a transceiver and a processor, where the transceiver and the processor are connected using a data bus; the transceiver receives a network access request sent by a user equipment; if the processor determines, according to the network access request, that the user equipment meets a set condition, perform authentication on the user equipment using a password-free authentication manner, or assign permission, which is corresponding to the set condition, on a Web administrator page to the user equipment; and if the processor determines, according to the network access request, that the user equipment does not meet the set condition, perform authentication on the user equipment using a password-specific authentication manner.

In a first possible implementation manner of the third aspect, the transceiver receives a request for accessing the Web administrator page that is sent by the user equipment; and if the processor determines, according to the request for accessing the Web administrator page, that the user equipment meets the set condition, authenticate, using the password-free authentication manner, management of accessing, by the user equipment, the Web administrator page, or assign the permission, which is corresponding to the set condition, on the Web administrator page to the user equipment.

With reference to the third aspect and any one of the foregoing possible implementation manners, in a second possible implementation manner, the set condition includes first M accessing user equipments after the wireless network device is turned on for the first time, or first N accessing user equipments after the wireless network device is powered on every time, where M=1, 2, 3 . . . , and N=1, 2, 3 . . . .

With reference to the third aspect and any one of the foregoing possible implementation manners, in a third possible implementation manner, the set condition further includes a user equipment whose MAC address is a specified MAC address, a user equipment whose IP address is a specified IP address, a user equipment whose equipment name is a specified equipment name, or a user equipment whose equipment type is a specified equipment type.

With reference to the third aspect and any one of the foregoing possible implementation manners, in a fourth possible implementation manner, the set condition further includes a user equipment that performs accessing at a set time after the wireless network device is powered on every time, a user equipment that performs accessing at a specified distance, or a user equipment that performs accessing at a specified time.

With reference to the third aspect and any one of the foregoing possible implementation manners, in a fifth possible implementation manner, if the processor determines that the user equipment meets the set condition, the processor performs access authentication on the user equipment using the password-free authentication manner, so that the user equipment establishes a connection to a network.

With reference to the third aspect and any one of the foregoing possible implementation manners, in a sixth possible implementation manner, if the processor determines that the user equipment meets the set condition, the processor performs management authentication, using the password-free authentication manner, on the user equipment for accessing the web administrator page, so that the user equipment accesses the web administrator page without a password.

With reference to the third aspect and any one of the foregoing possible implementation manners, in a seventh possible implementation manner, if the processor determines that the user equipment meets the set condition, the processor assigns read-only permission or read/write permission, which is corresponding to the set condition, on the Web administrator page to the user equipment.

According to a fourth aspect, an authentication processing system is provided, where the authentication processing system includes a user equipment and a wireless network device.

Step 1: The user equipment sends a network access request to the wireless network device.

Step 2: If the wireless network device determines, according to the network access request, that the user equipment meets a set condition, perform authentication on the user equipment using a password-free authentication manner, or assign permission, which is corresponding to the set condition, on a Web administrator page to the user equipment; and if the wireless network device determines, according to the network access request, that the user equipment does not meet the set condition, perform authentication on the user equipment using a password-specific authentication manner.

The wireless network device is used as an access point for wireless network access, or a terminal device into which a function of the access point for wireless network access is not integrated.

The network access request being a process of requesting the wireless network device to perform access authentication on the user equipment is a step before a user is prompted to enter an authentication password.

In the authentication method of the wireless network device, the processor of the wireless network device, and the wireless network device according to the embodiments of the present invention, if it is determined that a user equipment meets a first set condition, authentication is performed on the user equipment using a specific authentication manner, and corresponding authentication manners are used according to different user requirements, so that the authentication manner of the wireless network device is more flexible, and network access experience of a user is improved.

BRIEF DESCRIPTION OF DRAWINGS

To describe technical solutions in embodiments of the present invention more clearly, the following briefly introduces accompanying drawings required for describing the embodiments of the present invention. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes technical solutions in embodiments of the present invention with reference to accompanying drawings in the embodiments of the present invention. The described embodiments are a part rather than all of the embodiments of the present invention. All other embodiments obtained by a person of ordinary skill in the art based on the embodiments of the present invention without creative efforts shall fall within a protection scope of the present invention.

The embodiments of the present invention relate to a method of using different authentication manners or permission assigning according to different authentication conditions, a controller of a wireless network device, and the wireless network device. Using a routing device as an example, currently, in terms of user authentication manners, only one authentication manner can be supported. For example, if an encryption manner of Wi-Fi of the routing device is set to WPA, users must use the WPA to access the routing device. For another example, the routing device generally performs network configuration management using a Web page, and an administrator password must be first entered before the Web page is accessed. This is unnecessary for an owner of the routing device, and reduces use experience of the owner of the routing device. To solve the foregoing problems, the embodiments of the present invention provide a method in which different authentication manners can be executed according to different user equipments.

In the embodiments of the present invention, the wireless network device involves at least one of a specific access authentication manner for a user equipment accessing a network, a specific management authentication manner for a Web administrator page, and specific permission settings for Web administrator page access. The three may be executed independently of each other, and may also be associated with each other. Specifics are set according to user requirements. The following describes the technical solutions of the present invention using specific embodiments.

Figure 1:
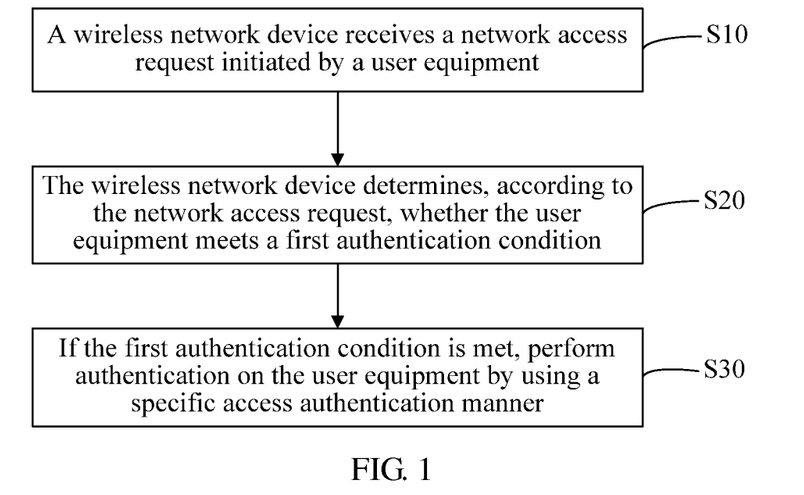
FIG. 1 is a flowchart of an access authentication method of a wireless network device according to a first embodiment of the present invention.

FIG. 1 is a flowchart of an access authentication method of a wireless network device according to a first embodiment of the present invention.

S10: A wireless network device receives a network access request initiated by a user equipment.

S20: The wireless network device determines, according to the network access request, whether the user equipment meets a first set condition.

S30: If the wireless network device determines that the user equipment meets the first set condition, perform access authentication on the user equipment using a specific access authentication manner.

It can be understood that, if the wireless network device determines that the user equipment does not meet the first set condition, the wireless network device performs access authentication on the user equipment using a common password-based access authentication manner.

In the authentication method of the wireless network device according to the embodiment of the present invention, if it is determined that a user equipment meets a first set condition, authentication is performed on the user equipment using a specific authentication manner, and corresponding authentication manners are used according to different user requirements, so that the authentication manner of the wireless network device is more flexible, and network access experience of a user is improved.

The first set condition may include first M accessing user equipments after the wireless network device is turned on for the first time, or first N accessing user equipments after the wireless network device is powered on every time, where M=1, 2, 3 . . . , and N=1, 2, 3 . . . .

The first set condition may further include a user equipment whose MAC address is a specified MAC address, a user equipment whose IP address is a specified IP address, a user equipment whose equipment name is a specified equipment name, or a user equipment whose equipment type is a specified equipment type.

The first set condition may further include a user equipment that performs accessing at a set time after the wireless network device is powered on every time, or a user equipment that performs accessing at a specified distance and a user equipment that performs accessing at a specified time.

The set time may be at least one discrete time point, and may also be a set time period or time range; the specified time may be at least one discrete time point, and may also be a set time period or time range; the specified distance may be a point at the specified distance, and may also be an area within the specified distance. For example, in the embodiments of the present invention, the wireless network device can detect, using a distance sensor, a distance between the user equipment and the wireless network device, a location of the user equipment, or the like, and add a condition of the distance between the user equipment and the wireless network device or a condition of the location to the first set condition.

Optionally, the user equipment can also detect the distance between the user equipment and the wireless network device, or location information of the user equipment, and when the user equipment sends the network access request, add the distance between the user equipment and the wireless network device, or the location information of the user equipment to the network access request, so that the wireless network device can determine whether the user equipment is within the specified distance according to the distance that is received.

That the wireless network device determines, according to the network access request, whether the user equipment meets a first set condition may be the wireless network device may obtain the MAC address of the user equipment, and the equipment type, the equipment name, and the equipment IP address of the user equipment according to the network access request, and may further obtain one or a combination of information about the distance between the user equipment and the wireless network device, and the location information of the user equipment that are carried in the network access request, to determine whether the user equipment meets the first set condition; but the embodiment of the present invention is not limited thereto.

Optionally, the wireless network device may also not obtain information about the user equipment, and the wireless network device determines, according to a signal of the network access request, whether the user equipment meets the first set condition.

The wireless network device searches the first set condition, according to the network access request, for an authentication condition suiting the user equipment, and the wireless network device can, in the first set condition, use a manner of sequential detection or detection in a reverse sequence.

Further, the if the wireless network device determines that the user equipment meets the first set condition, performing authentication on the user equipment using a specific access authentication manner may be, if the wireless network device determines that the user equipment meets the first set condition, the authentication may be performed on the user equipment according to a user differentiation rule list using the specific access authentication manner, where the user differentiation rule list records a correspondence between the first set condition and the specific access authentication manner.

Optionally, if the wireless network device determines that the user equipment meets the first set condition, the specific access authentication manner may also be directly specified for the user equipment according to the signal of the access request, without setting the user differentiation rule list.

The specific authentication manner may include a password-free access authentication manner or a specific password-based access authentication manner, but the embodiment of the present invention is not limited thereto.

It can be understood that, in the specific password-based access authentication manner in the embodiments of the present invention, the authentication may be performed using a specific character, fingerprint, human face, voice, or the like.

For example, if the wireless network device determines, according to the network access request sent by the user equipment, that the user equipment meets the first set condition, a user does not need to enter a password, a password required dialog box is not displayed either, and the user equipment is directly connected to a network; and optionally, access authentication may also be performed using a specific password that is different from an existing password that is uniformly set.

It can be understood that, the first set condition in the user differentiation rule list may be set by a device manufacturer in advance, and may also be set, according to requirements, by a user that has completed access. For example, in the first set condition, the device manufacturer or an operator needs to set, in advance before shipment, first N accessing user equipment of the wireless network device that is turned on for the first time, so that first N accessing users edit another authentication condition according to requirements. Certainly, a user in first-time access may also access the wireless network device by entering a password, and access a Web administrator page using a manner of a user name plus a password, so as to edit the first set condition, where the editing may include an operation such as deletion, addition, or modification of the first set condition.

It can further be understood that, the wireless network device may further, according to the access request sent by the user equipment, obtain and record the information about the user equipment in the user differentiation rule list, for example, the number of accessing users, and the equipment type, the equipment name, the IP address, and the MAC address of the user equipment, so as to update the user differentiation rule list, where the information about the user equipment may be information about the user equipment in first-time access, and may also be information about a user equipment in non-first-time access.

If the wireless network device determines, according to the user differentiation rule list, that the user equipment does not meet the first set condition, the access authentication is performed on the user equipment using a password input manner. That is, by means of a user entering a password, the access authentication is performed on the user equipment, and an authentication process based on an existing protocol is executed, which will not be described herein again.

It can further be understood that, the user equipment in the embodiments of the present invention may be a terminal electronic device supporting network access, such as a personal computer (PC), a mobile phone, or a tablet.

In the access authentication method of the wireless network device according to the embodiment of the present invention, if it is determined that a user equipment meets a first set condition, authentication is performed on the user equipment using a specific access authentication manner, and corresponding authentication manners are used according to different user requirements, so that the authentication manner of the wireless network device is more flexible, and network access experience of a user is improved.

Figure 2:
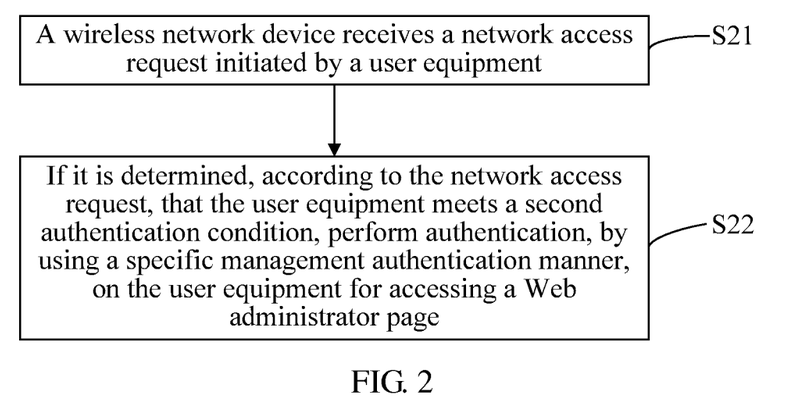
FIG. 2 is a flowchart of a management authentication method of a wireless network device for accessing a Web administrator page according to a second embodiment of the present invention.

FIG. 2 is a flowchart of a management authentication method of a wireless network device for accessing a Web administrator page according to a second embodiment of the present invention.

In the present invention, Embodiment 2 is based on Embodiment 1. A difference lies in that this embodiment implements the management authentication method for accessing the Web administrator page.

S21: The wireless network device receives the network access request initiated by the user equipment.

S22: If the wireless network device determines, according to the network access request, that the user equipment meets a second set condition, perform authentication, using a specific management authentication manner, on the user equipment for accessing the Web administrator page.

The second set condition may be any one or a combination of first P accessing user equipment after the wireless network device is turned on for the first time, first Q accessing user equipment after the wireless network device is powered on every time, a user equipment that performs accessing at a set time after the wireless network device is powered on every time, a user equipment whose MAC address is a specified MAC address, a user equipment whose IP address is a specified IP address, a user equipment whose equipment name is a specified equipment name, a user equipment whose equipment type is a specified equipment type, a user equipment that performs accessing at a specified distance, and a user equipment that performs accessing at a specified time, where P=1, 2, 3 . . . , and Q=1, 2, 3 . . . .

It can be understood that, the set time may be at least one discrete time point, and may also be a time period or a time range; the specified time may be at least one discrete time point, and may also be a time period or a time range; the specified distance may be a point at the specified distance, and may also be an area within the specified distance.

The specific management authentication manner may be an authentication manner for accessing the Web administrator page without a password, or an authentication manner for accessing the Web administrator page with a specific password.

Optionally, the wireless network device can further determine, according to a user's request for accessing the Web administrator page, whether the user equipment meets the second set condition.

Optionally, the wireless network device can determine, according to equipment information carried in the network access request or according to the signal of the network access request, whether the user equipment meets the second set condition.

It can be understood that, the second set condition and the first set condition may be the same and may also be different. Steps of determining may be executed at the same time, and may also be executed sequentially.

In the management authentication method of the wireless network device according to the embodiment of the present invention, if it is determined that a user equipment meets a second set condition, authentication is performed, using a specific management authentication manner, on a user for accessing a Web administrator page, and corresponding authentication manners are used according to different user requirements, so that a manner in which the user accesses the Web administrator page is more flexible, and user experience is improved.

Figure 3:
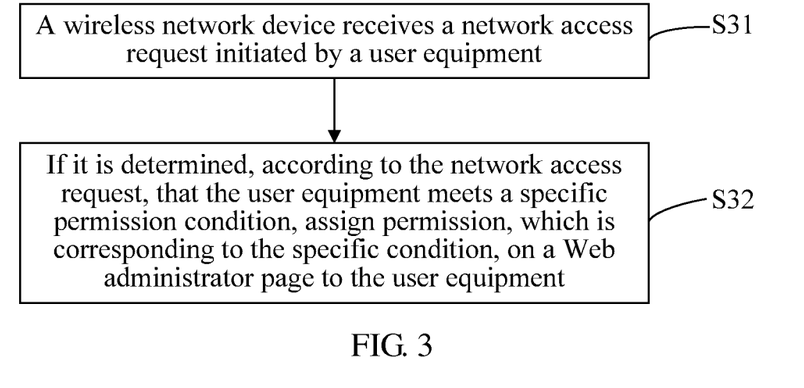
FIG. 3 is a flowchart of a permission management method of a wireless network device for accessing a Web administrator page according to a third embodiment of the present invention.

FIG. 3 is a flowchart of a permission management method of a wireless network device for accessing a Web administrator page according to a third embodiment of the present invention.

In the present invention, the third embodiment is based on the foregoing Embodiment 1 and/or Embodiment 2. A difference lies in that the permission management method for the Web administrator page is implemented.

S31: The wireless network device receives the network access request initiated by the user equipment.

S32: If it is determined, according to the network access request, that the user equipment meets a specific permission condition, assign permission, which is corresponding to the specific permission condition, on the Web administrator page to the user equipment.

The specific permission condition may be any one or a combination of first P accessing user equipment after the wireless network device is turned on for the first time, first Q accessing user equipment after the wireless network device is powered on every time, a user equipment that performs accessing at a set time after the wireless network device is powered on every time, a user equipment whose MAC address is a specified MAC address, a user equipment whose IP address is a specified IP address, a user equipment whose equipment name is a specified equipment name, a user equipment whose equipment type is a specified equipment type, a user equipment that performs accessing at a specified distance, and a user equipment that performs accessing at a specified time, where P=1, 2, 3 . . . , and Q=1, 2, 3 . . . .

It can be understood that, the set time may be at least one discrete time point, and may also be a set time period or time range; the specified time may be at least one discrete time point, and may also be a set time period or time range; the specified distance may be a point at the specified distance, and may also be an area within the specified distance.

The permission may include read-only permission or read/write permission on the Web administrator page, but the embodiment of the present invention is not limited thereto.

Optionally, the wireless network device can further determine, according to a user's request for accessing the Web administrator page, whether the user equipment meets the specific permission condition.

In the permission management method of the wireless network device according to the embodiment of the present invention, if it is determined that a user equipment meets a specific permission condition, permission, which is corresponding to the specific permission condition, on a Web administrator page is assigned to the user equipment, so that the Web administrator page can be managed flexibly according to different users, and user experience is improved.

Figure 4:
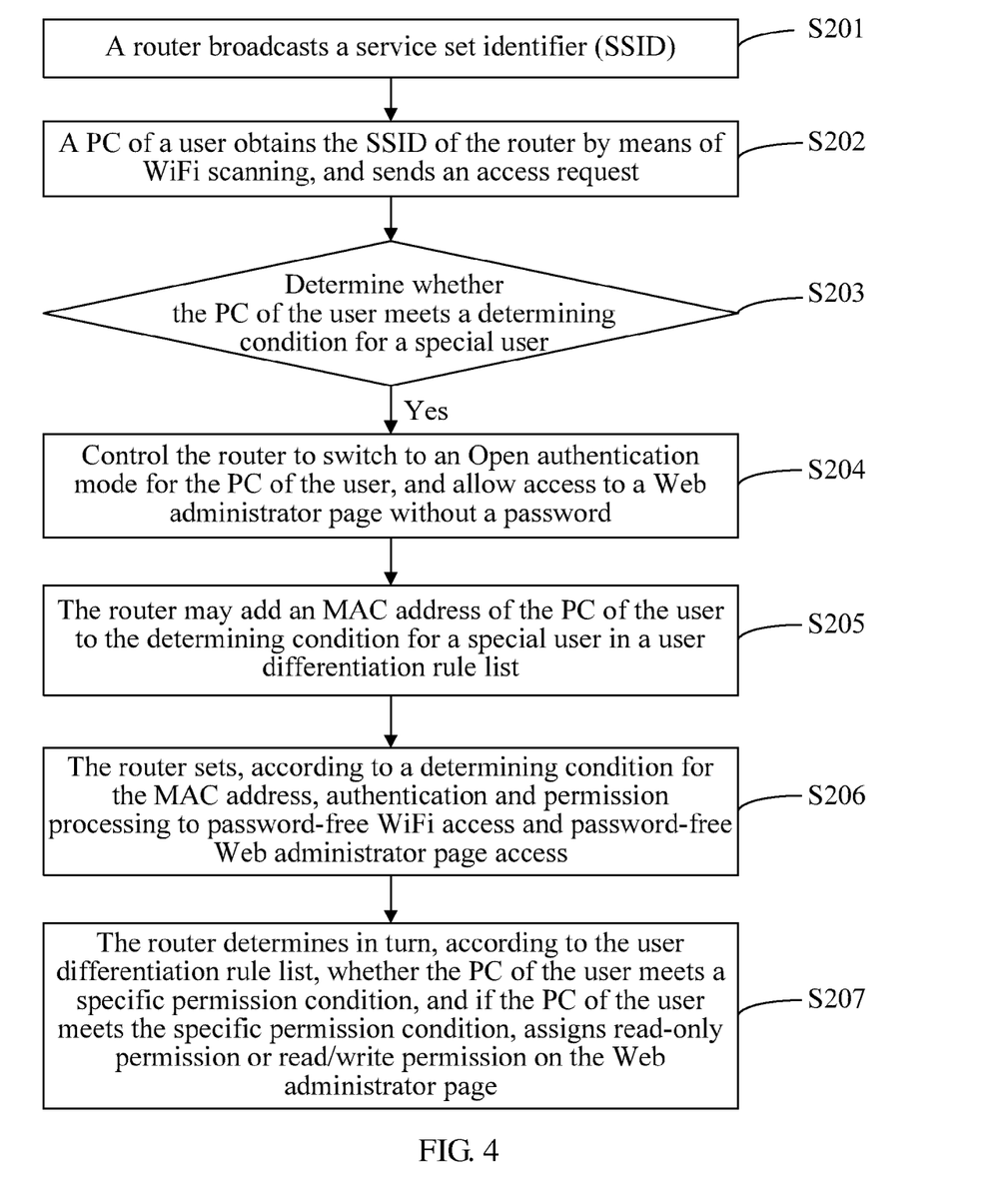
FIG. 4 is a flowchart of an authentication and permission assigning method of a wireless network device according to a fourth embodiment of the present invention.

FIG. 4 is a flowchart of an authentication and permission assigning method of a wireless network device according to a fourth embodiment of the present invention.

In this embodiment, based on the foregoing embodiments, a method of the access authentication on, management authentication on, and permission assigning to the user equipment is further described in detail, which, however, is used only as an embodiment to describe the technical solutions of the present invention, but is not used as a limitation on the protection scope of the present invention.

This embodiment is described using a router as an example of the wireless network device and using a PC of a user as an example of the user equipment.

Before delivery, a manufacturer of the router performs default configuration of the "user differentiation rule list", for example, as shown in Table 1:

TABLE 1

| No. | First set condition | Access authentication manner |
|---|---|---|
| 1 | First accessing user of the wireless network device that is turned on for the first time | Password-free Wi-Fi access |

S201: The router broadcasts a service set identifier (SSID).

S202: The PC of the user obtains the SSID of the router by means of Wi-Fi scanning, and sends an access request, where the access request carries a MAC address of the PC of the user.

S203: The router determines in turn, according to the user differentiation rule list, whether the PC of the user meets the first set condition.

S204: If it is determined that the PC of the user meets a condition of "a first accessing user equipment after the router is turned on for the first time" in the user differentiation rule list, control authentication on the PC of the user by the router to be switched to an Open authentication mode, that is, a password-free access authentication mode, for the PC of the user.

A user in first-time access can save the trouble of entering a password, and directly accesses the network.

S205: The router may add the MAC address of the PC of the user to the first set condition in the user differentiation rule list.

It can be understood that, the MAC address of the PC of the user may also be configured by the user on the Web administrator page.

It can be understood that, the router may also obtain other equipment information of the PC of the user, and add the other equipment information of the PC of the user to the user differentiation rule list, which is not limited by this embodiment.

S206: The router determines in turn, according to the user differentiation rule list, whether the PC of the user meets the second set condition, and if the PC of the user meets the second set condition, sets that the PC of the user accesses the Web administrator page without a password.

The second set condition may be the "first accessing user of the wireless network device that is turned on for the first time" in Table 2, may also be another condition of the second set condition, and is described herein only as an example.

TABLE 2

| No. | Second set condition | Management authentication manner |
|---|---|---|
| 1 | First accessing user of the wireless network device that is turned on for the first time | Accessing the Web administrator page without a password |

S207: The router determines in turn, according to the user differentiation rule list, whether the PC of the user meets the specific permission condition, and if the PC of the user meets the specific permission condition, assigns the read-only permission or the read/write permission on the Web administrator page.

For example, the user rule list may be shown in Table 3:

TABLE 3

| No. | Specific permission condition | Permission |
|---|---|---|
| 1 | First accessing user of the wireless network device that is turned on for the first time | Read-only permission or read/write permission |

The specific permission condition may be the "first accessing user of the wireless network device that is turned on for the first time and a specified MAC address" in Table 3, may also be another condition of the specific permission condition, and is described herein only as an example.

It can be understood that, the router may determine the authentication or permission condition of the user equipment according to the user rule list that is stored in advance, and may also determine whether the PC of the user meets the authentication or permission condition directly according to request information or activation information that is sent by the user.

It can be understood that, a sequence of performing the foregoing steps S203 to S207 is not limited, and they may also be performed at the same time. This embodiment provides only one example for description.

In the embodiment of the present invention, if a router determines that a personal computer (PC) of the user is a first accessing user, the router allows the PC of the user to access Wi-Fi without a password, access a Web administrator page without a password, and have read/write permission on the Web administrator page. The user can avoid searching for a password and performing a password input operation, which provides very good user experience for a common consumer who is not clear about a method for using the router.

Figure 5:
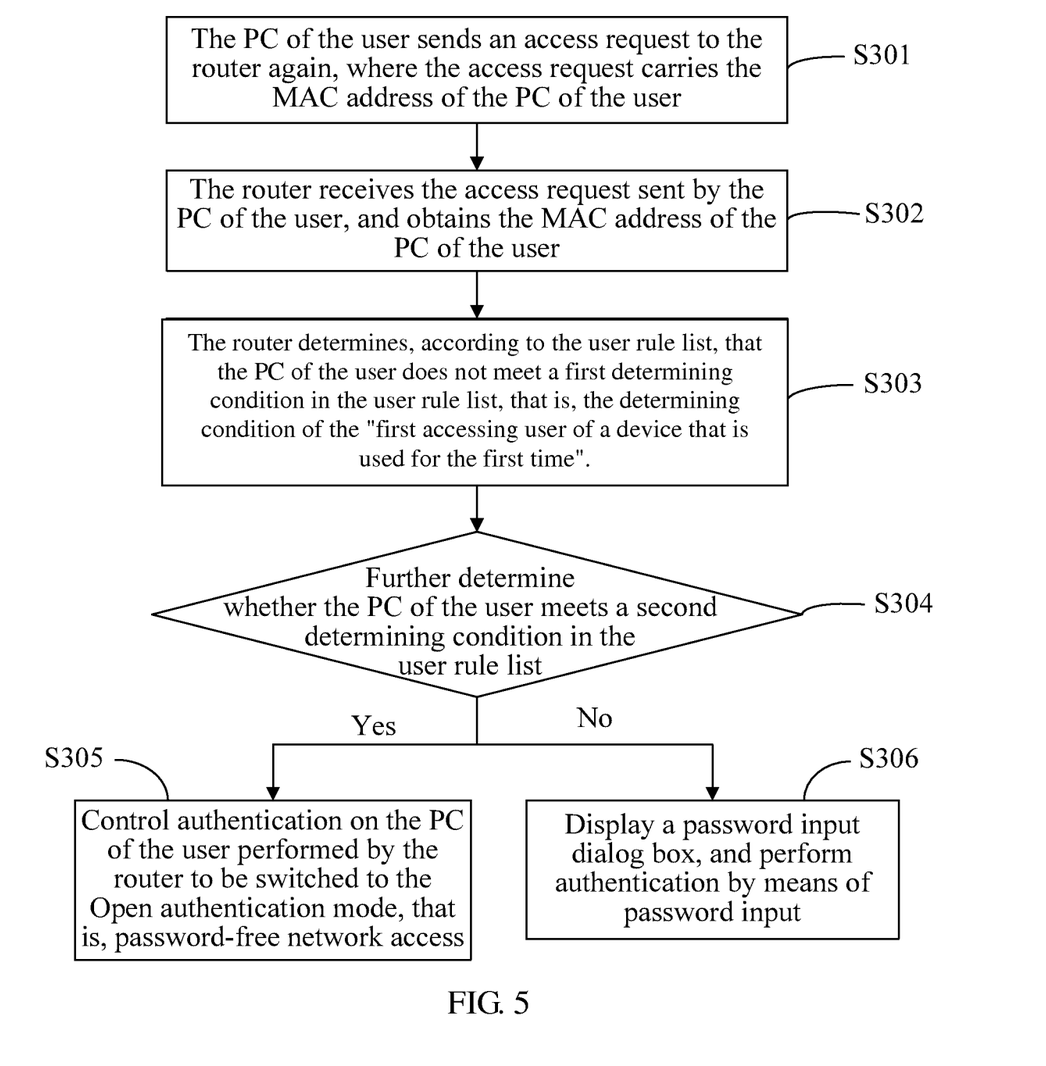
FIG. 5 is a flowchart of an access authentication method of a wireless network device according to a fifth embodiment of the present invention.

FIG. 5 is a flowchart of an access authentication method of a wireless network device according to a fifth embodiment of the present invention.

Based on the foregoing fourth embodiment, this embodiment further describes, using an example, a process in which authentication and/or permission processing is performed when the PC of the user accesses the router again. When the PC of the user accesses the router again, the condition of the "first accessing user of a device that is used for the first time" is not met; and therefore, this embodiment further describes or exemplifies the process in which the router performs authentication and/or permission processing in this situation.

S301: The PC of the user sends an access request to the router again, where the access request carries the MAC address of the PC of the user.

The MAC address of the PC of the user is 44-45-53-54-00-00. Certainly, the access request may also carry a name of the PC of the user, a type of the PC of the user, and the like.

S302: The router receives the access request sent by the PC of the user, and obtains the MAC address of the PC of the user.

S303: The router determines, according to the user rule list, that the PC of the user does not meet a first determining condition in the user rule list, that is, the determining condition of the "first accessing user of a device that is used for the first time".

S304: The router further determines whether the PC of the user meets a second determining condition in the user rule list, that is, whether a MAC address that has been recorded in the user rule list is matched.

S305: If the router determines that the MAC address of the PC of the user matches the MAC address recorded in the user rule list, control authentication on the PC of the user performed by the router to be switched to the Open authentication mode, that is, password-free network access.

Optionally, if the router determines that the MAC address of the PC of the user matches the MAC address recorded in the user rule list, the PC of the user is set to be capable of accessing the Web administrator page without a password.

Optionally, if the router determines that the MAC address of the PC of the user matches the MAC address recorded in the user rule list, the PC of the user is assigned the read or read/write permission on the Web administrator page.

S306: If the router determines that the MAC address of the PC of the user does not match the MAC address recorded in the user rule list, display a password input dialog box, and perform authentication by means of password input.

When the user needs to modify the user rule list of the router, the user may open a browser on the PC of the user. The PC of the user meets a condition for accessing the Web administrator page; and therefore the user does not see a dialog box for entering a user name/password, and directly logs in to the Web administrator page as an administrator, so as to perform at least one operation, such as modification, addition, or deletion, on the user rule list.

For example, when the user wants to add a mobile phone whose MAC address is 44-45-53-54-00-01 as a user with password-free access authentication, the user may access the Web administrator page, and add a condition 3 in which the MAC address is 44-45-53-54-00-01, and an authentication manner corresponding to the added MAC address, for example, password-free Wi-Fi access. Refer to Table 4:

TABLE 4

| No. | First set condition | Access authentication manner |
|---|---|---|
| 1 | First accessing user of the wireless network device that is turned on for the first time | Password-free Wi-Fi access |
| 2 | MAC address: 44-45-53-54-00-00 | Password-free Wi-Fi access |
| 3 | MAC address: 44-45-53-54-00-01 | Password-free Wi-Fi access |

In this embodiment, the authentication is further described based on the foregoing fourth embodiment, but is provided only as an example, and is not intended to limit the protection scope of the present invention. Password-free access is implemented using a user equipment with a specified MAC address, which simplifies an access operation of a user, and brings convenience for the user.

Figure 6:
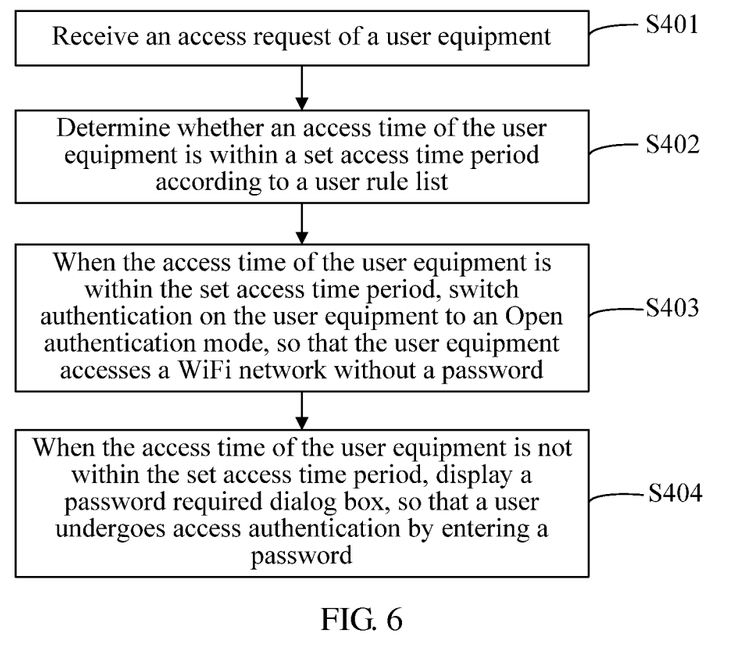
FIG. 6 is a flowchart of an access authentication method according to a sixth embodiment of the present invention.

FIG. 6 is a flowchart of an access authentication method according to a sixth embodiment of the present invention.

In this embodiment, a condition of a predetermined time period is added to the user identification list, so that a specific access authentication manner is used on all user equipment that perform accessing in the predetermined time period. The user identification list may be shown in Table 5:

TABLE 5

| No. | First set condition | Access authentication manner |
|---|---|---|
| 1 | Access time period/every day: 18:00-21:00 | Password-free Wi-Fi access |

Optionally, Table 5 may include the determining condition of the access time period according to user settings, or may include another determining condition according to user settings. This embodiment describes only a specific example.

Steps are as follows:

S401: Receive an access request of a user equipment.

S402: Determine whether an access time of the user equipment is within a set access time period according to the user rule list.

S403: When the access time of the user equipment is within the set access time period, switch authentication on the user equipment to an Open authentication mode, so that the user equipment accesses a Wi-Fi network without a password.

S404: When the access time of the user equipment is not within the set access time period, display a password required dialog box, so that the user performs access authentication by entering a password.

In the access authentication method of the user equipment in this embodiment, the predetermined time period is set, so that the user equipment can access a network within a specific time period without a password, which simplifies an access operation of a special user.

It can be understood that, for the wireless network device involved in the embodiments of the present invention, a manufacturer of the wireless network device may also force a user equipment in first-time access to be allowed for access only after a password is entered, and the user equipment in second-time access may determine the authentication manner according to settings of the user rule list; and the specific access authentication manner may also be defined by default for a user equipment whose equipment type, equipment name, or the like is specified. Specific implementations may be formulated according to user requirements or manufacturer requirements, are not limited to the embodiments provided in the embodiments of the present invention, and may all use a technical means in the embodiments of the present invention to implement customization in another scenario.

It can be further understood that, in the embodiments of the present invention, the first set condition, the second set condition, and the specific permission condition of the wireless network device may be the same and may also be different, implementation manners of the three may be independent from each other, and authentication on or permission assigning of different objects may also be implemented according to a same determining condition. Examples described in the embodiments of the present invention provide only implementation manners in limited scenarios, an implementation manner in another scenario does not depart from a basic idea of the embodiments of the present invention, and a person skilled in the art can definitely infer, according to the foregoing embodiments, implementation solutions under other circumstances, which are not described one by one herein again.

Figure 7:
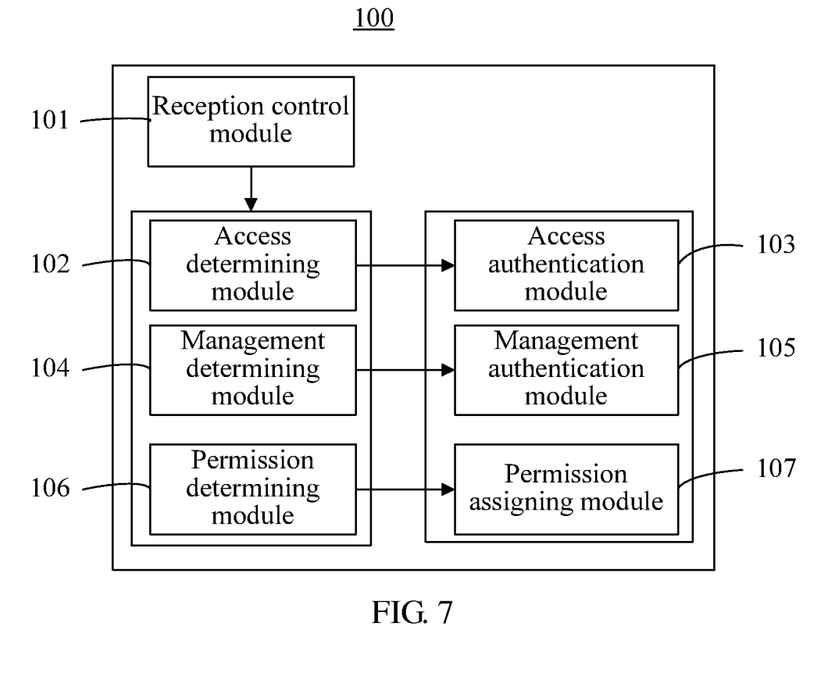
FIG. 7 is a framework diagram of a controller of a wireless network device according to a seventh embodiment of the present invention.

FIG. 7 is a framework diagram of a controller of a wireless network device according to a seventh embodiment of the present invention.

A controller 100 of the wireless network device can use at least one of a specific access authentication manner, a specific management authentication manner, and a specific permission assigning manner with respect to different users, and the controller 100 may include a reception control module 101, an access determining module 102, and an access authentication module 103, where the reception control module 101 is configured to control a receiver to receive a network access request sent by a user equipment; if it is determined, according to the network access request, that the user equipment meets a first set condition, the access determining module 102 sends a first result of determining to the authentication module; and according to the first result of determining, the access authentication module 103 performs access authentication on the user equipment using the specific access authentication manner.

In the controller of the wireless network device according to the embodiment of the present invention, if it is determined that a user equipment meets a first set condition, authentication is performed on the user equipment using a specific authentication manner, and corresponding authentication manners are used according to different user requirements, so that the authentication manner of the wireless network device is more flexible, and network access experience of a user is improved.

The first set condition includes any one or a combination of first M accessing user equipments after the wireless network device is turned on for the first time, first N accessing user equipments after the wireless network device is powered on every time, a user equipment that performs accessing at a set time after the wireless network device is powered on every time, a user equipment whose MAC address is a specified MAC address, a user equipment whose IP address is a specified IP address, a user equipment whose equipment name is a specified equipment name, a user equipment whose equipment type is a specified equipment type, a user equipment that performs accessing at a specified distance, and a user equipment that performs accessing at a specified time, where M=1, 2, 3 . . . , and N=1, 2, 3 . . . .

The set time may be at least one discrete time point, and may also be a set time period or time range; the specified time may be at least one discrete time point, and may also be a set time period or time range; the specified distance may be a point at the specified distance, and may also be an area within the specified distance. For example, in the embodiment of the present invention, the controller can detect, by controlling a distance sensor, a distance between the user equipment and the wireless network device, a location of the user equipment, or the like, and add a condition of the distance between the user equipment and the wireless network device or a condition of the location to the first set condition.

That the access determining module 102 determines, according to the network access request, whether the user equipment meets the first set condition may be the access determining module 102 may obtain a MAC address of the user equipment, and an equipment type, an equipment name, and an equipment IP address of the user equipment according to the network access request, and may further obtain one or a combination of information about the distance between the user equipment and the wireless network device and location information of the user equipment that are carried in the network access request, to determine whether the user equipment meets the first set condition; but the embodiment of the present invention is not limited thereto.

Optionally, the access determining module 102 may also not obtain information about the user equipment, and determines, according to a signal of the network access request, whether the user equipment meets the first set condition.

Further, the if the wireless network device determines that the user equipment meets the first set condition, performing authentication on the user equipment using the specific access authentication manner may be, if the wireless network device determines that the user equipment meets the first set condition, the authentication may be performed on the user equipment according to a user differentiation rule list using the specific access authentication manner, where the user differentiation rule list records a correspondence between the first set condition and the specific access authentication manner.

Optionally, the determining, by the wireless network device, that the user equipment meets the first set condition may further be directly specifying the specific access authentication manner for the user equipment.

The specific authentication manner may include a password-free access authentication manner or a specific password-based access authentication manner, but the embodiment of the present invention is not limited thereto.

It can be understood that, in the specific password-based access authentication manner in the embodiment of the present invention, the authentication may be performed using a specific character, fingerprint, human face, voice, or the like.

Optionally, the controller 100 may further include a management determining module 104 and a management authentication module 105, where the management determining module 104 sends a second result of determining to the management authentication module 105 if it is determined that the user equipment meets a second set condition; and according to the second result of determining, the management authentication module 105 performs management authentication, using the specific management authentication manner, on the user equipment for accessing a Web administrator page.

The second set condition may be any one or a combination of first P accessing user equipments after the wireless network device is turned on for the first time, first Q accessing user equipments after the wireless network device is powered on every time, a user equipment that performs accessing at a set time after the wireless network device is powered on every time, a user equipment whose MAC address is a specified MAC address, a user equipment whose IP address is a specified IP address, a user equipment whose equipment name is a specified equipment name, a user equipment whose equipment type is a specified equipment type, a user equipment that performs accessing at a specified distance, and a user equipment that performs accessing at a specified time, where P=1, 2, 3 . . . , and Q=1, 2, 3 . . . . The specific management authentication manner may be an authentication manner for accessing the Web administrator page without a password, or an authentication manner for accessing the Web administrator page using a specific password.

Optionally, the controller 100 may further include a permission determining module 106 and a permission assigning module 107, where the permission determining module 106 sends a third result of determining to the permission assigning module 107 if it is determined that the user equipment meets a specific permission condition; and the permission assigning module 107 assigns permission, which is corresponding to the specific permission condition, on the Web administrator page to the user equipment according to the third result of determining.

The specific permission condition may be any one or a combination of first S accessing user equipment after the wireless network device is turned on for the first time, first T accessing user equipment after the wireless network device is powered on every time, a user equipment that performs accessing at a set time after the wireless network device is powered on every time, a user equipment whose MAC address is a specified MAC address, a user equipment whose IP address is a specified IP address, a user equipment whose equipment name is a specified equipment name, a user equipment whose equipment type is a specified equipment type, a user equipment that performs accessing at a specified distance, and a user equipment that performs accessing at a specified time, where S=1, 2, 3 . . . , and T=1, 2, 3 . . . .

The permission may include read-only permission or read/write permission on the Web administrator page.

In the controller of the wireless network device according to the embodiment of the present invention, if it is determined that a user equipment meets a first set condition, authentication is performed on the user equipment using a specific access authentication manner, and corresponding authentication manners are used according to different user requirements, so that the authentication manner of the wireless network device is more flexible, and network access experience of a user is improved.

For the controller of the wireless network device in this embodiment, reference may be made to the fourth to sixth embodiments for a specific example, which will not be repeated in this embodiment.

Figure 8:
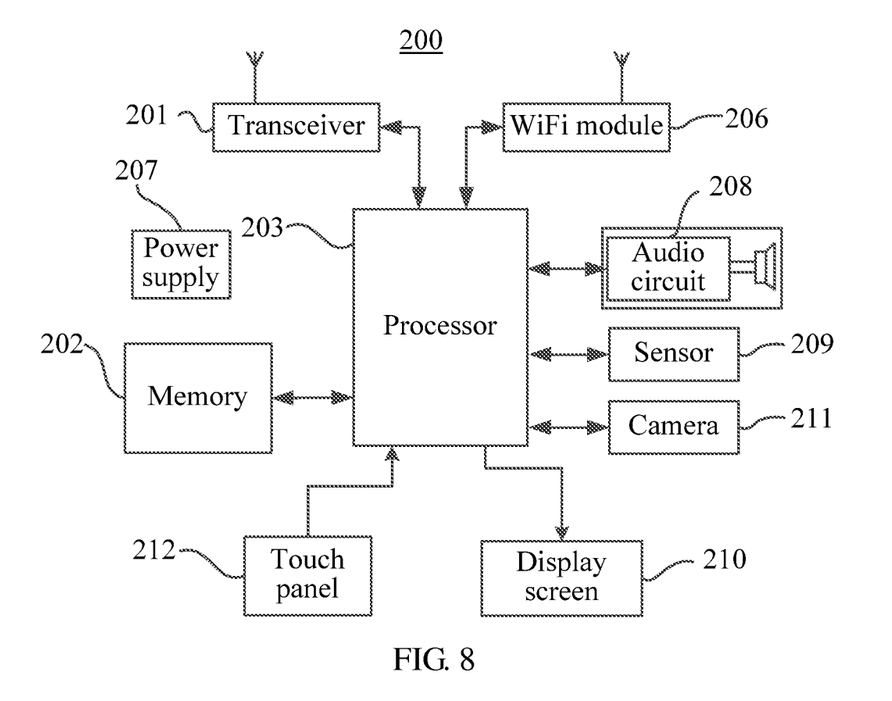
FIG. 8 is a framework diagram of a wireless network device according to an eighth embodiment of the present invention.

FIG. 8 is a framework diagram of a wireless network device according to an eighth embodiment of the present invention.

A wireless network device 200 may include a transceiver 201 and a processor 203, where the transceiver 201 and the processor 203 are connected using a data bus; the transceiver 201 receives a network access request initiated by a user equipment; and if the processor 203 determines, according to the network access request, that the user equipment meets a first set condition, perform access authentication on the user equipment using a specific access authentication manner.

In the wireless network device according to the embodiment of the present invention, if it is determined that a user equipment meets a first set condition, authentication is performed on the user equipment using a specific authentication manner, and corresponding authentication manners are used according to different user requirements, so that the authentication manner of the wireless network device is more flexible, and network access experience of a user is improved.

The first set condition may include any one or a combination of first M accessing user equipment after the wireless network device is turned on for the first time, first N accessing user equipment after the wireless network device is powered on every time, a user equipment that performs accessing at a set time after the wireless network device is powered on every time, a user equipment whose MAC address is a specified MAC address, a user equipment whose IP address is a specified IP address, a user equipment whose equipment name is a specified equipment name, a user equipment whose equipment type is a specified equipment type, a user equipment that performs accessing at a specified distance, and a user equipment that performs accessing at a specified time, where M=1, 2, 3 . . . , and N=1, 2, 3 . . . .

The set time may be at least one discrete time point, and may also be a set time period or time range; the specified time may be at least one discrete time point, and may also be a set time period or time range; the specified distance may be a point at the specified distance, and may also be an area within the specified distance. For example, in the embodiment of the present invention, the controller can detect, by controlling a distance sensor, a distance between the user equipment and the wireless network device, a location of the user equipment, or the like, and add a condition of the distance between the user equipment and the wireless network device or a condition of the location to the first set condition.

That the processor 203 determines, according to the network access request, whether the user equipment meets the first set condition may be the processor 203 may obtain a MAC address of the user equipment, and an equipment type, an equipment name, and an equipment IP address of the user equipment according to the network access request, and may further obtain one or a combination of information about the distance between the user equipment and the wireless network device and location information of the user equipment that are carried in the network access request, to determine whether the user equipment meets the first set condition; but the embodiment of the present invention is not limited thereto.

Optionally, the processor 203 may also not obtain information about the user equipment, and determines, according to a signal of the network access request, whether the user equipment meets the first set condition.

Further, the if the processor 203 determines that the user equipment meets the first set condition, performing authentication on the user equipment using the specific access authentication manner may be, if the processor 203 determines that the user equipment meets the first set condition, the authentication may be performed on the user equipment according to a user differentiation rule list using the specific access authentication manner, where the user differentiation rule list records a correspondence between the first set condition and the specific access authentication manner.

Optionally, the determining, by the processor 203, that the user equipment meets the first set condition may further be directly specifying the specific access authentication manner for the user equipment.

The specific authentication manner may include a password-free access authentication manner or a specific password-based access authentication manner, but the embodiment of the present invention is not limited thereto.

It can be understood that, in the specific password-based access authentication manner in the embodiment of the present invention, the authentication may be performed using a specific character, fingerprint, human face, voice, or the like.

Optionally, if the processor 203 determines that the user equipment meets a second set condition, the processor 203 performs management authentication, using a specific management authentication manner, on the user equipment for accessing a Web administrator page.

The second set condition may be any one or a combination of first P accessing user equipment after the wireless network device is turned on for the first time, first Q accessing user equipment after the wireless network device is powered on every time, a user equipment that performs accessing at a set time after the wireless network device is powered on every time, a user equipment whose MAC address is a specified MAC address, a user equipment whose IP address is a specified IP address, a user equipment whose equipment name is a specified equipment name, a user equipment whose equipment type is a specified equipment type, a user equipment that performs accessing at a specified distance, and a user equipment that performs accessing at a specified time, where P=1, 2, 3 . . . , and Q=1, 2, 3 . . . . The specific management authentication manner may be an authentication manner for accessing the Web administrator page without a password, or an authentication manner for accessing the Web administrator page using a specific password.

Optionally, if the processor 203 determines that the user equipment meets a specific permission condition, the processor 203 assigns permission, which is corresponding to the specific permission condition, on the Web administrator page to the user equipment.

The specific permission condition may be any one or a combination of first S accessing user equipments after the wireless network device is turned on for the first time, first T accessing user equipments after the wireless network device is powered on every time, a user equipment that performs accessing at a set time after the wireless network device is powered on every time, a user equipment whose MAC address is a specified MAC address, a user equipment whose IP address is a specified IP address, a user equipment whose equipment name is a specified equipment name, a user equipment whose equipment type is a specified equipment type, a user equipment that performs accessing at a specified distance, and a user equipment that performs accessing at a specified time, where S=1, 2, 3 . . . , and T=1, 2, 3 . . . .

The permission may include read-only permission or read/write permission on the Web administrator page.

It can be understood that, the wireless network device in the embodiment of the present invention may further include a display screen 210, a camera 211, a touch panel 212, an audio circuit 208, and the like, which separately obtain a fingerprint, a human face image, voice data, or the like, to perform authentication and/or permission assigning.

The display screen 210 may include a display panel, where, for the display panel, the display panel may be configured using a form, such as a liquid crystal display (LCD) and an organic light-emitting diode (OLED). Further, the touch panel 212 may cover the display panel; after the touch panel 212 detects a touch operation on the touch panel or nearby, the touch panel transmits the touch operation to the processor 203 to determine a touch event type, and then the processor 203 provides corresponding visual output on the display panel according to the touch event type. The touch panel 212 and the display panel may be used as two independent components to implement input and output functions of the wireless network device 200, and the touch panel 212 and the display panel may also be integrated to implement the input and output functions of the wireless network device 200.

It can be understood that the processor 203 may include at least one processing chip.

The wireless network device 200 may further include a memory 202, a Wi-Fi module 206, and a power supply 207, where the processor 203 controls the Wi-Fi module 206 and the power supply 207.

In the embodiment of the present invention, the transceiver 201 may be the Wi-Fi module 206, and may belong to a short-distance wireless transmission technology; and using the Wi-Fi module 206, the wireless network device 200 can help a user receive and send an email, browse a web page, access streaming media, and the like, which provides wireless broadband Internet access for the user.

For the power supply 207 (for example, a battery) configured to supply power to components, preferably, the power supply 207 may be logically connected to the processor 203 using a power supply management system, so that functions of management of charging, discharging, power consumption, and the like are implemented using the power supply management system.

For the wireless network device in this embodiment, reference may be made to the fourth to sixth embodiments for a specific and detailed example, which will not be repeated in this embodiment.

The wireless network device according to the embodiment of the present invention determines a condition that a user equipment meets, uses a specific access authentication manner according to a corresponding condition, and can use a compliant authentication and/or permission assigning manner according to requirements of different users, thereby improving user experience.

An embodiment of the present invention further relates to an authentication processing system, where the authentication processing system includes a user equipment and a wireless network device.

Step 1: The user equipment sends an access request to the wireless network device.

Step 2: If the wireless network device determines, according to the network access request, that the user equipment meets a first set condition, perform access authentication on the user equipment using a specific access authentication manner.

The first set condition may include any one or a combination of first M accessing user equipment after the wireless network device is turned on for the first time, first N accessing user equipment after the wireless network device is powered on every time, a user equipment that performs accessing at the set time after the wireless network device is powered on every time, a user equipment whose MAC address is a specified MAC address, a user equipment whose IP address is a specified IP address, a user equipment whose equipment name is a specified equipment name, a user equipment whose equipment type is a specified equipment type, a user equipment that performs accessing at a specified distance, and a user equipment that performs accessing at a specified time, where M=1, 2, 3 . . . , and N=1, 2, 3 . . . .

The specific access authentication manner may include a password-free access authentication manner or a specific password-based access authentication manner.

Optionally, if the wireless network device further determines that the user equipment meets a second set condition, the wireless network device performs management authentication, using a specific management authentication manner, on the user equipment for accessing a Web administrator page.

The second set condition is any one or a combination of first P accessing user equipment after the wireless network device is turned on for the first time, first Q accessing user equipment after the wireless network device is powered on every time, a user equipment that performs accessing at a set time after the wireless network device is powered on every time, a user equipment whose MAC address is a specified MAC address, a user equipment whose IP address is a specified IP address, a user equipment whose equipment name is a specified equipment name, a user equipment whose equipment type is a specified equipment type, a user equipment that performs accessing at a specified distance, and a user equipment that performs accessing at a specified time, where P=1, 2, 3 . . . , and Q=1, 2, 3 . . . .

The specific management authentication manner may be an authentication manner for accessing the Web administrator page without a password, or an authentication manner for accessing the Web administrator page using a specific password.

The wireless network device is further configured to, if it is determined that the user equipment meets a specific permission condition, assign permission, which is corresponding to the specific permission condition, on the Web administrator page to the user equipment.

The specific permission condition may be any one or a combination of first S accessing user equipment after the wireless network device is turned on for the first time, first T accessing user equipment after the wireless network device is powered on every time, a user equipment that performs accessing at a set time after the wireless network device is powered on every time, a user equipment whose MAC address is a specified MAC address, a user equipment whose IP address is a specified IP address, a user equipment whose equipment name is a specified equipment name, a user equipment whose equipment type is a specified equipment type, a user equipment that performs accessing at a specified distance, and a user equipment that performs accessing at a specified time, where P=1, 2, 3 . . . , and Q=1, 2, 3 . . . . The permission may include read-only permission or read/write permission on the Web administrator page.

An access authentication system according to the embodiment of the present invention determines a condition that a user equipment meets, uses a specific authentication manner and/or permission assigning according to a corresponding condition, and can use a compliant authentication and/or permission assigning manner according to requirements of different users, thereby improving user experience.

A person of ordinary skill in the art shall understand that, aspects or possible implementation manners of the aspects of the present invention may be implemented as a system, a method, or a computer program product. Therefore, the aspects or the possible implementation manners of the aspects of the present invention may take forms of hardware only embodiments, software only embodiments (including firmware, resident software, and the like), and embodiments with a combination of software and hardware aspects. In addition, the aspects or the possible implementation manners of the aspects of the present invention may take a form of a computer program product, where the computer program product refers to computer readable program code that is stored in a computer readable medium.

The computer readable medium may be a computer readable signal medium or a computer readable storage medium. The computer readable storage medium includes but is not limited to an electronic, magnetic, optical, electromagnetic, infrared, or semiconductor system, device, or apparatus, or any appropriate combination of the foregoing, for example, a random access memory (RAM), a read-only memory (ROM), an erasable programmable read only memory (EPROM or a flash memory), an optical fiber, a portable read-only memory (a compact-disc read-only memory (CD-ROM)).

A processor in a computer reads the computer readable program code that is stored in the computer readable medium, so that the processor can execute a functional action that is specified in every step or a combination of steps in a flowchart, and generate an apparatus that takes a functional action that is specified in every block or a combination of blocks in a block diagram.

The computer readable program code can be executed completely on a computer of a user, be executed partially on the computer of the user, be executed as an independent software package, be executed partially on the computer of the user and partially on a remote computer, or be executed completely on the remote computer or on a server. It should also be noted that, in some alternative implementation solutions, the functions that are indicated in the steps in the flowchart or the blocks in the block diagram may not occur in a sequence that is indicated in a drawing. For example, two steps or two blocks that are continuously shown depending on an involved function may be executed substantially at the same time, or the blocks may be executed in a reverse sequence sometimes.

Obviously, a person skilled in the art may make various modifications and variations to the present invention without departing from the spirit and the scope of the present invention. The present invention is intended to cover these modifications and variations provided that they fall within the scope of protection defined by the claims of the present invention and equivalent technologies of the present invention.

What is claimed is:

1. An access point for controlling access of a user equipment to a wireless network comprising:
at least one hardware processor configured to:
receive a request message sent by the user equipment for accessing the wireless network, wherein the request message comprises a media access control (MAC) address of the user equipment;
determine whether the user equipment is one of a first number N of user equipment accessing the wireless network after the access point is powered on, wherein N is a positive integer;
enable the user equipment to access the wireless network without authentication on the user equipment when the user equipment is one of the first N user equipment;
determine whether the MAC address of the user equipment is a predefined MAC address when the user is not one of the first N users;
enable, by the access point, the user equipment to access a web administrator page after the user equipment accesses the wireless network when the MAC address of the user equipment is the predefined MAC address; and
request the user equipment to send a password to access the wireless network when the MAC address of the user equipment is not the predefined MAC address and when the user equipment is not one of the first N user equipment.

2. The access point according to claim 1, wherein the hardware processor is further configured to enable the user equipment to access a web administrator page when the user equipment accesses the wireless network without authentication on the user equipment.

3. The access point according to claim 1, wherein the hardware processor is further configured to assign a read-only permission to the user equipment on the web administrator page based on the MAC address of the user equipment when the user equipment accesses the web administrator page.

4. The access point according to claim 1, wherein the hardware processor is further configured to assign a read and write permission to the user equipment on the web administrator page based on the MAC address of the user equipment when the user equipment accesses the web administrator page.

5. An access point for controlling access of a user equipment to a wireless network comprising:
   at least one hardware processor;
   a memory configured to store instructions, wherein the instructions cause the hardware processor to:
      receive a request message for accessing the wireless network sent by the user equipment, wherein the request message carries a media access control (MAC) address of the user equipment;
      determine whether the user equipment is one of a first number N of user equipment accessing the wireless network after the access point is powered on, wherein N is a positive integer;
      enable the user equipment to access the wireless network without authentication on the user equipment when the user equipment is one of the first N user equipment; and
      determine whether the MAC address of the user equipment is a predefined MAC address;
      enable the user equipment to access the wireless network without authentication on the user equipment when the MAC address of the user equipment is the predefined MAC address; and
      request the user equipment to send a password to access the wireless network when the MAC address of the user equipment is not the predefined MAC address and when the user equipment is not one of the first N user equipment.

6. The access point according to claim 5, wherein the instructions further cause the hardware processor to enable the user equipment to access a web administrator page when the user equipment accesses the wireless network without authentication on the user equipment.

7. The access point according to claim 6, wherein the instructions further cause the hardware processor to assign a read-only permission to the user equipment on the web administrator page based on the MAC address of the user equipment when the user equipment accesses the web administrator page.

8. The access point according to claim 6, wherein the instructions further cause the hardware processor to assign a read and write permission to the user equipment on the web administrator page based on the MAC address of the user equipment when the user equipment accesses the web administrator page.

9. A processing method performed by an access point, comprising:
   receiving a request message sent by a user equipment for accessing a wireless network, wherein the request message comprises a media access control (MAC) address of the user equipment;
   determining whether the user equipment is one of a first number N of user equipment accessing the wireless network after the access point is powered on, wherein N is a positive integer;
   enabling the user equipment to access the wireless network without authentication on the user equipment when the user equipment is one of the first N user equipment;
   determining whether the MAC address of the user equipment is a predefined MAC address when the user is not one of the first N users;
   enabling the user equipment to access a web administrator page after the user equipment accesses the wireless network when the MAC address of the user equipment is the predefined MAC address; and
   prompting the user equipment for a password to access the wireless network when the MAC address of the user equipment is not the predefined MAC address and when the user is not one of the first N users.

10. The method according to claim 9 further comprising enabling the user equipment to access a web administrator page when the user equipment accesses the wireless network without authentication on the user equipment.

11. The method according to claim 9 further comprising assigning a read-only permission to the user equipment on the web administrator page based on the MAC address of the user equipment when the user equipment accesses the web administrator page.

12. The method according to claim 9 further comprising assigning a read and write permission to the user equipment on the web administrator page based on the MAC address of the user equipment when the user equipment accesses the web administrator page.

* * * * *